Oct. 16, 1951 — G. A. TINNERMAN — 2,571,786
BOLT FASTENING DEVICE
Filed July 3, 1946

George A. Tinnerman
INVENTOR.
BY H. G. Lombard
ATTORNEY.

Patented Oct. 16, 1951

2,571,786

UNITED STATES PATENT OFFICE 2,571,786

BOLT FASTENING DEVICE

George A. Tinnerman, Cleveland, Ohio, assignor to Tinnerman Products, Inc., Cleveland, Ohio, a corporation of Ohio Application July 3, 1946, Serial No. 681,331

1 Claim. (Cl. 151—41.75)

This invention relates in general to bolt fastened installations and deals, more particularly, with improvements in bolt holding devices for attaching standard bolts, screws, rivets, and similar studs in fastening position in an assembly prior to the application of a cooperating nut device thereto for securing the parts of the assembly.

In many assemblies, it is necessary or desirable to use a standard nut and bolt fastening means but it is usually a difficult problem in blind locations, for the operator to hold the bolt in place as the nut is applied, or otherwise, to maintain the bolt against rotation during the final tightening of the nut therewith. In such an assembly in which the rearward side of a part is not conveniently or readily accessible for holding a bolt in fastening position prior to the application of the nut, it has been the practice to resort to various forms of cage devices requiring a welding or riveting operation for attaching the same in providing means for holding the bolt in fastening position. Such welding or riveting operation involves considerably increased costs in manufacture which often make the use of this type of bolt holder prohibitive in many installations requiring a cheap and inexpensive fastening means, while such fasteners otherwise are objectionable by reason of the inordinate amount of time required in the installation thereof in an assembly.

A primary object of this invention, therefore, is to provide an improved form of bolt holder or retainer which is relatively simple and inexpensive to manufacture and includes in its construction a highly practical form of bolt retaining means together with means designed for quick and easy clip or snap fastening application to attach the bolt in fastening position in an installation in a minimum of time and effort.

A further, more specific object of the invention is for the provision of various forms of bolt holders for conventional or standard bolts comprising a sheet metal device designed for clip or snap fastening attachment to a part to retain the bolt in fastening position thereon while otherwise holding the bolt against axial displacement and/or turning as the associated nut is threaded thereon and tightened.

Another object of the invention is to provide various forms of bolt holders of this character embodying integral clip or snap fastening means providing a positive nonrotatable attachment of a bolt in an opening in a part in a manner to prevent turning of the bolt as a nut is tightened thereon, and to prevent loosening of the bolt from tightened fastening position incidental to vibration, strain, and jarring effects in a completed installation.

Further objects and advantages, and other new and useful features in the construction, arrangement and general combination of parts of the invention will be readily apparent to those skilled in the art as the following description proceeds with reference to the accompanying drawings, for purposes of illustration but not of limitation, in which like reference characters designate like parts throughout the same, and in which.

Figure 1:
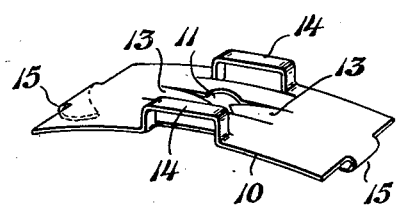
Figure 1 is a perspective view of one form of the improved bolt holder of the invention.
Figure 2:
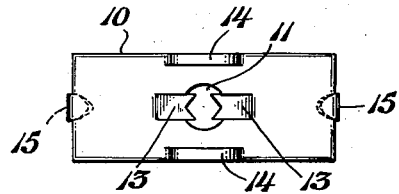
Figure 2 is a plan view of the bolt holder shown in Figure 1.

Referring now, more particularly, to the drawings, the bolt holder shown in Figures 1 and 2 is constructed from a sheet metal section of a size and configuration determined by the size and shape of the bolt head with which it is to be used. The bolt holder may be designed for use with any type of bolt head and in the present example, it is shown employed with a standard bolt 1 having a square head 2. The bolt holder may be constructed from any suitable sheet metal, preferably that of spring metal nature such as spring steel or cold rolled steel having spring like characteristics.

Figure 3:
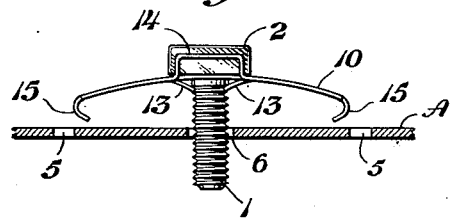
Figure 3 is a sectional view illustrating the bolt holder of Figures 1 and 2 assembled with a bolt and as initially applied to attached relation with a part to be secured.

The sheet metal section forming the bolt holder 10 is formed preferably in a generally bowed or arched body provided in its center area with longitudinal slits on either side of a central opening 11 to define a pair of resilient tongues 13—13. These tongues are designed to engage resiliently the bolt shank in the manner of clutch to permit passage of the bolt shank through the opening 11 in one direction to assembled relation with the bolt holder, as shown in Figure 3, and thereafter prevent any reverse axial movement of the bolt toward disassembly from the bolt holder.

Adjacent the longitudinal edges of the blank, parallel slits are provided forming strips of metal which are bent upwardly in the manner of substantial loops 14 the edges of which define pronounced shoulders or abutments for engaging opposing faces of the bolt head.

The ends of the bolt holder include fingers or hooks 15 extending generally downwardly and inwardly to the underside of the fastener body. As illustrated in Figure 3, the body of the bolt holder is arched in its normal untensioned relation so that the attaching hooks 15 have a spacing slightly less than the spacing of the recesses 5 in the part A to which the bolt holder is to be attached. The hooks 15, accordingly, are so spaced that the arched body of the bolt holder must be flattened and thereby distended as necessary to permit said hooks to be received in the recesses 5 in the attached position of the bolt holder as shown in Figure 4.

Attachment of the bolt holder is easily and quickly effected by inserting one of the hooks 15 into a recess 5 and then applying pressure to the fastener body to flatten and elongate the same sufficiently to permit the other hook to snap into its associated recess 5. When pressure is removed from the fastener body it attempts to assume its initial bowed configuration and thereby draws the hooks 15 inwardly toward each other into locking engagement with adjacent edges of the recesses 5.

The bolt 1 may be assembled with the bolt holder, and thereby secured to the part A, either before or after the bolt holder is attached to said part. Accordingly, with the bolt holder first attached to part A in the manner just described, the bolt shank is passed axially through the opening 11 between the tongues 13—13, and through the stud opening 6 in part A, to the position shown in Figure 4 wherein the bolt head bears upon the fastener body and opposing faces thereof are snugly received between the shoulders or abutments 14. During the axial movement of the bolt shank past the tongues 13—13, the extremities of said tongues ratchet over the bolt threads to a position adjacent the underside of the bolt head. In this position the tongues bite into the bolt shank and prevent any reverse axial movement which would tend toward separation of the bolt from assembled relation with the bolt holder. Inasmuch as the bolt is held against turning by the shoulders 14 in engagement with the side faces of the bolt head, the bolt in its applied fastening position shown in Figure 4, is securely attached to part A against relative rotative as well as reverse axial movement.

Figure 4:
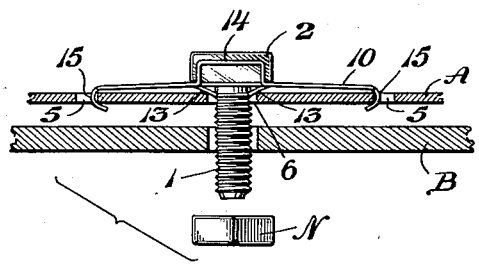
Figure 4 is a similar view showing the bolt holder in attached position on a part and holding the bolt against rotation as a nut is applied to secure said part with a cooperating part.

Similarly, the bolt may be first assembled with the bolt holder as shown in Figure 3, and the assembly then attached to the part A as seen in Figure 4. In this relation, the panel opening 6 may be made slightly oversize for lateral shifting of the bolt shank 1 as necessary to permit insertion of one of the hooks 15 in a recess 5 whereupon pressure is exerted on the bolt head 2 to flatten the arched fastener body and thereby permit the other hook 15 to snap into its associated recess 5.

From the foregoing it will be appreciated that the bolt holder of the present invention is admirably suited for blind fastening installations wherein the head of a bolt in assembled relation is not conveniently or readily accessible for the application of a tool to hold the bolt and prevent turning thereof as the associated nut is applied thereto and tightened. Thus, as will be understood from Figure 4, after the bolt has been attached to part A by the bolt holder of the invention, a cooperating part B may be secured thereto by the nut N in a simple operation taking place entirely from the outer or readily accessible side of part B.

Figure 5:
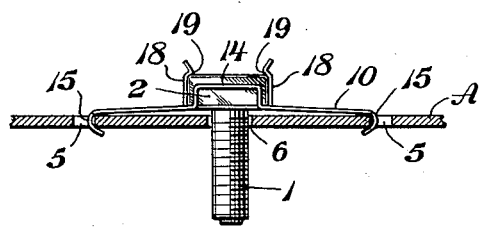
Figure 5 is a sectional view showing another form of bolt holder in attached position holding a bolt on a part to be secured.

Figure 5 shows another form of the invention which is generally similar in construction, application and use to that described with reference to Figures 1-4 inclusive except for the means for retaining the bolt against axial movement in the direction toward disassembly from the bolt holder. Instead of the tongues 13—13 in Figures 1-4 inclusive for this purpose, equivalent means are provided in the manner of spring arms 18 which are struck from the material of the fastener body and bent upwardly for engagement with the sides of the bolt head 2 intermediate the shoulders defined by loops 14. Preferably, the spring arms 18 are designed for snap fastening engagement with the bolt head 2 and accordingly, the extremities thereof are provided with detents 19 and otherwise flared outwardly to facilitate application of the bolt head between said spring arms to assembled relation with the bolt holder.

Figure 6:
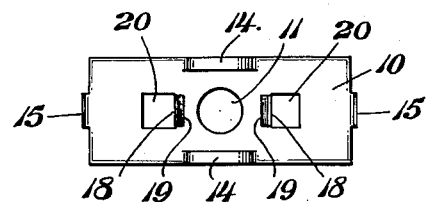
Figure 6 is a plan view of the bolt holder in Figure 5.

As shown in Figure 6, the spring arms 18 of this character may be obtained from partially severed areas 20 on either side of the stud passage 11 defining elements which are integral with the fastener body and readily bent out of the plane thereof to the desired configuration. The spring arms 18 may be provided in an alternate construction shown in Figure 7 by partially severed areas 21 at the center of the fastener body which are separated by a slit, indicated by the dotted line, and bent upwardly out of the plane of the fastener body to form the desired spring arms 18. The region from which the spring arms are bent as shown in Figure 7 defines a central opening between said spring arms serving as a passage for the bolt shank.

Figure 7:
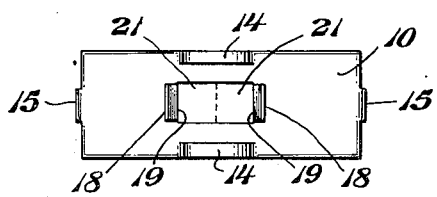
Figure 7 is another plan view of the bolt holder in Figure 5 illustrating an alternate construction thereof.

In the embodiments of Figures 5-7 inclusive, the bolt also may be assembled with the bolt holder either prior to or after the bolt holder is attached to the part A to be secured, substantially as described with reference to Figures 1-4 inclusive. This is easily effected in either procedure by inserting the bolt shank axially through the stud passage in the fastener body to a position in which opposing faces of the bolt head are received between the shoulders 14, with other opposed faces in line with the spring arms 18. Engagement of the bolt head with the outwardly flared extremities of the spring arms spreads the same as necessary to permit the bolt head to be received therebetween with the detents 19 engaging the top of the bolt head to prevent reverse axial movement of the bolt from assembled relation with bolt holder. The bolt in applied fastening position consequently is held against relative turning by the shoulders 14 engaging opposing faces of the bolt head while the spring arms 18 which also engage other opposing faces of the bolt head contribute to this action and otherwise hold the bolt against axial displacement by reason to the resilient detents 19 in engagement with the top of the bolt head, as aforesaid.

Accordingly, in any form of the invention it will be appreciated that the improved bolt holder is designed to retain a bolt on a part to be secured against relative rotative movement as well as axial displacement so that the fastening thereof with a cooperating part is easily and quickly effected, especially in blind locations, simply by applying a nut onto the bolt without need for holding the bolt against turning as the nut is rotated or tightened thereon.

It will be appreciated further, that in any form, the bolt holder may be attached by means other than the hooks 15, and accordingly, while the use of the attaching hooks 15 is preferred, the invention is not limited to this construction.

Additionally, it will be noted that in each form of the invention the holder or retainer includes a portion serving as a bearing washer under the head or clamping surface of the bolt or other rotary clamping member, thereby dispensing with need for such washers and also lock washers which makes for considerable savings not only in the cost of these devices, but also in the amount of assembly time and cost of labor involved in assembling operations.

While the invention has been described in detail with specific examples, such examples are intended as illustrations only, since it will be apparent to those skilled in the art that other modifications in the construction, arrangement and general combination of parts may be devised without departing from the spirit and scope of the invention. The present embodiments are therefore to be considered in all respects as illustrative and not restrictive, the scope of the invention being indicated by the appended claim rather than by the foregoing description, with all changes falling within the scope, meaning and range of equivalency of the claim intended to be embraced therein.

What is claimed and desired to be secured by United States Letters Patent is:

A fastening device comprising a combined bolt and bolt holder, said bolt having a head provided with spaced side faces in parallel relation to the axis of the bolt shank, said bolt holder being assembled on said bolt head and comprising a generally bowed sheet metal body provided with spaced partially severed portions defining spaced continuous strips having a spacing corresponding substantially to the spacing of said side faces on the bolt head, each of said strips having its ends integral with said sheet metal body and its intermediate portion bent upwardly out of the plane of said body in the form of an enlarged loop defining a single continuous elongate shoulder extending across the major portion of a side face on said bolt head in abutting relation thereto, said sheet metal body of the bolt holder having an opening between said spaced strips receiving the bolt shank, tongues provided from the material of said sheet metal body having their extremities adjacent said opening and projecting downwardly from said body with the extremities of said tongues engaging said bolt shank to retain the bolt in assembly with said bolt holder, and spaced hooks on said generally bowed body of the bolt holder adapted to be secured in spaced openings in a part upon distention of said generally bowed body to hold the bolt on said part against both relative rotative movement and axial displacement.

GEORGE A. TINNERMAN.

REFERENCES CITED

The following references are of record in the file of this patent:

UNITED STATES PATENTS

| Number | Name | Date |
| --- | --- | --- |
| 598,320 | Knapp | Feb. 1, 1898 |
| 746,453 | Buch | Dec. 8, 1903 |
| 1,272,919 | Crawford | July 16, 1918 |
| 1,545,402 | Coyne | July 7, 1925 |
| 1,613,906 | Rohour | Jan. 11, 1927 |
| 1,697,317 | Kyle | Jan. 1, 1929 |
| 1,928,468 | Tinnerman | Sept. 26, 1933 |
| 1,985,333 | Wiley | Dec. 25, 1934 |
| 2,281,056 | Tinnerman | Apr. 28, 1942 |
| 2,281,700 | Langmaid | May 5, 1942 |
| 2,391,046 | Tinnerman | Dec. 18, 1945 |
| 2,413,669 | Whitcombe | Dec. 31, 1946 |